United States Patent [19]

Martin et al.

[11] Patent Number: 4,949,245
[45] Date of Patent: Aug. 14, 1990

[54] INTERMEDIATE MEMORY SYSTEM FOR CONNECTING MICROCOMPUTERS TO A ROTATING DISK MEMORY

[75] Inventors: Peter D. Martin, Coral Springs; Larry Groshart, Fort Lauderdale; Guy Rabbat, Boca Raton; Sandra Wolner, Pompano Beach, all of Fla.

[73] Assignee: Modular Computer Systems, Inc., Fort Lauderdale, Fla.

[21] Appl. No.: 260,714

[22] Filed: Oct. 21, 1988

[51] Int. Cl.⁵ .............................................. G06F 12/00
[52] U.S. Cl. ................................ 364/200; 364/240.1; 364/236.2; 364/248.1; 364/232.8; 364/252; 364/238.4
[58] Field of Search ......................... 364/200, 300, 900

[56] References Cited
U.S. PATENT DOCUMENTS 4,811,277 3/1989 May et al. ..................... 364/900 X Primary Examiner—Raulfe B. Zache
Attorney, Agent, or Firm—Spencer & Frank

[57] ABSTRACT

A method of storing data on a peripheral rotating disk memory system, which is connected to one of a plurality of central processor units via a common bus including temporarily storing, in an intermediate memory system connected to the bus, original data packets which are to be stored in the disk memory system separating data block and commands of the original data packets received by the intermediate memory system from each other, creating composite data packets containing a new command and all data of a number of original data packets received by the intermediate memory system, writing the composite data packets via the bus on the rotating disk memory device, and purging the intermediate memory system after completing a write operation.

6 Claims, 2 Drawing Sheets

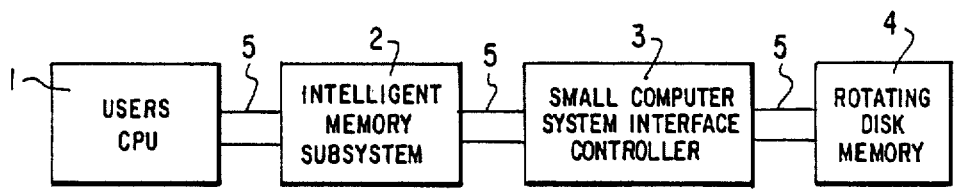
FIG. 1
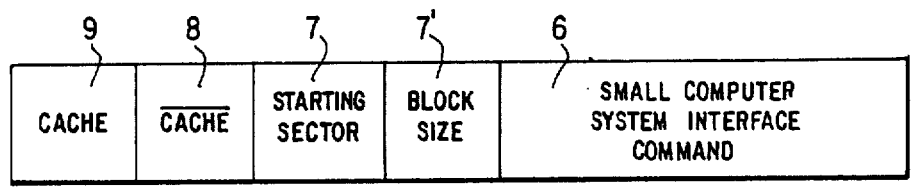
FIG. 2
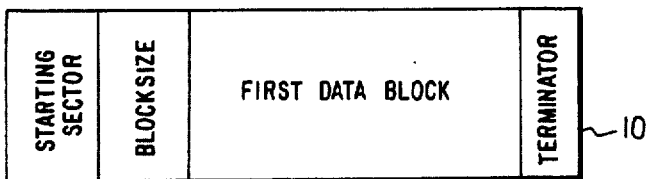
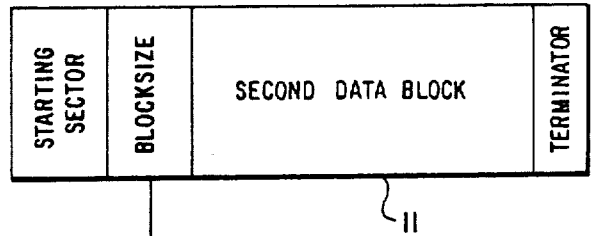
FIG. 3
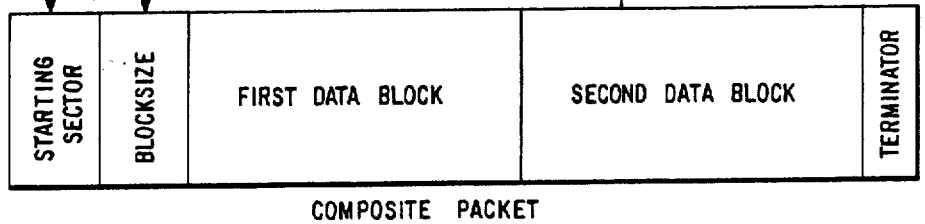

INTERMEDIATE MEMORY SYSTEM FOR CONNECTING MICROCOMPUTERS TO A ROTATING DISK MEMORY

FIELD OF THE INVENTION

This invention relates to microcomputer systems which use the small computer system interface (SCSI) bus standard, and is particularly directed to an intelligent interface system for connecting a central processor unit (CPU) with peripheral devices like rotating magnetic or optical disk memories and storing data in aforementioned disk memories. It also relates to rotational latency reduction means for allocating data in a rotating magnetic or optical disk memory.

PRIOR ART

In previously proposed computer systems which uses the SCSI interface standard, when a write command is sent to a disk memory, every individual command contains the address of the sector on the disk where the writing is to be performed. In order to locate the correct sector, the control electronics must first mechanically position the write head radially over the correct cylinder on the disk surface. When the head is radially correctly positioned, the control electronics must wait for the correct sector to pass under the write head. The time required to perform this second operation is defined as the rotational latency of the disk system. The maximal rotational latency is the time required for one complete revolution of the disk. The minimal latency is zero. When multiple data transfer commands are sent in rapid succession from a central processor to a rotating disk memory, the rotational latency causes a reduction in system throughout performance since the SCSI bus standard requires a write command to complete before the next command is sent, and does not provide for pipelining of commands to peripheral devices such as rotating disk memories. Therefore, the interface electronics do not have the next command available, and the following command cannot be anticipated. Even if consecutive write commands are sent to the disk in an attempt to write to consecutive sectors on the disk, the first command cannot be interpreted in time to meet the next consecutive sector as it passes under the write head. Therefore, a second command suffers the rotational latency of waiting for the disk to make a complete revolution before the correct sector again passes under the write head. This results in an increase of average rotational latency.

SUMMARY OF THE INVENTION

In view of the prior art described above, it is an object of the present invention to provide an apparatus and method for allocating data on a rotating magnetic or optical disk memory or a similar memory device which achieves a high data transfer rate between the central processor and said memory device even when a user has many small data blocks to be written on the memory device.

A further object of the invention is to provide a method and apparatus to write and read a large number of data blocks with a single write command.

A still further object of the invention is to provide a method and apparatus to minimize the average latency of a rotational disk memory.

The foregoing and still other unenumerated object of the present invention are met by providing an intermediate memory system, with a Random Access Memory to cache a number of incoming packets of commands and data, disassembling the incoming packets, separating the data out of the packets and creating a new composite packet, and wherein the composite packet contains a new command and all the data from the original incoming packets. Then this single packet is sent to the memory device via the bus, where the data are written to the memory device as a single block incurring only a single latency penalty. To retrieve the data from the memory device, the composite packet is read from the memory device into the intermediate memory system. Then the original data are identified and separated from each other and sent from the intermediate memory system to the central processor unit in a series of read operations. Therefore, when multiple consecutive sectors are written, only the first sector written is subject to the rotational latency.

The invention will be most specifically described with relation to a preferred embodiment and thereto attached drawings.

BRIEF DESCRIPTION OF THE DRAWINGS

FIG. 1 is a block-diagram showing the overall environment of the computer system according to the invention, FIG. 2 is a command diagram showing the general structure of the composite packet command according to the invention, FIG. 3 is a diagram showing the detailed structure of a composite data packet according to the invention.

DESCRIPTION OF THE PREFERRED EMBODIMENT

Figure 4:
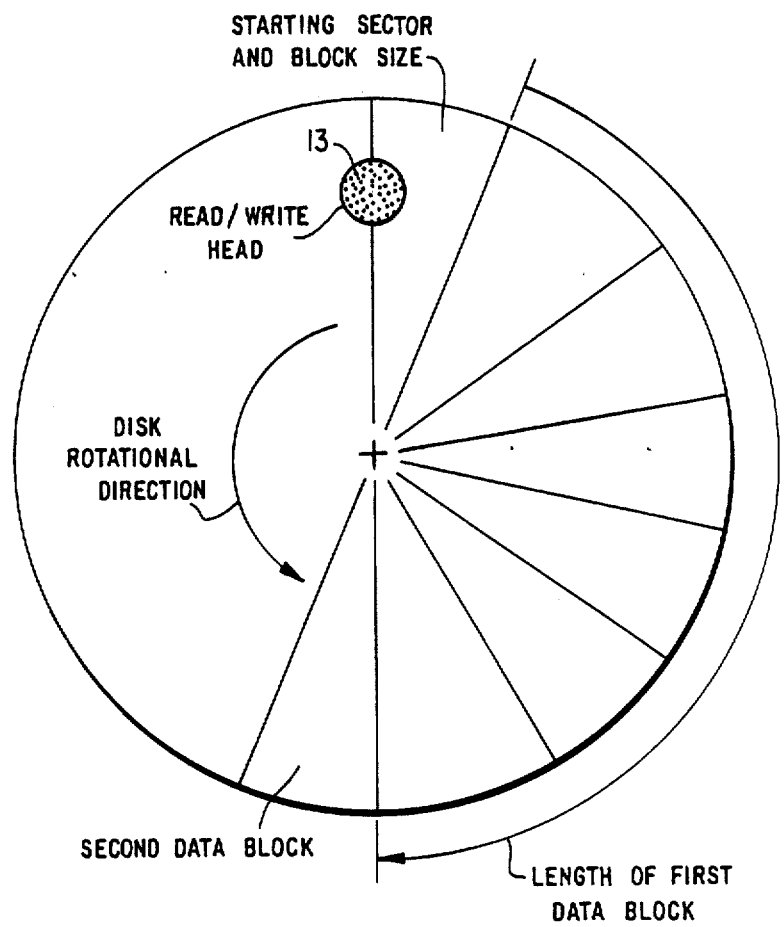
FIG. 4 illustrates a disk element of a rotating disk memory device.

In FIG. 1, CPU 1 is connected with the memory subsystem 2 and a SCSI controller 3 and the rotating disk memory 4 through a common bus 5. The memory subsystem 2, which includes a Random Access Memory (RAM), controls the communication between CPU 1, SCSI controller 3, and the memory device 4.

In order to control the intermediate memory subsystem 4, additional information is added to the SCSI command. This additional information includes the size of each data block.

FIG. 2 shows the structure of the command with the additional information added. The SCSI standard command 6 is a 6-byte command:

| byte | |
|---|---|
| 0 | Operation Code (0A for write, 08 for read) |
| 1 | Logical Unit Number/Logical Block Address |
| 2 | Logical Block Address |
| 3 | Logical Block Address (LSB) |
| 4 | Transfer Length |
| 5 | Control Byte (0) |

The preamble to the SCSI command 6 contains a code 8, 9 which commands the memory subsystem 2 to begin cacheing data. The command also contains the starting sector 7 on the disk where the data is to be written, and the size of the data block 7'. The subsystem 2 stores the command and data in its dedicated Random Access Memory (RAM) as a "model" data packet. The following data packet must contain data destined for the sector immediately following the final sector which will be written by the first data block. The data blocks of all packets must have the same size as that in the first packet.

FIG. 3 illustrates how each command received by the subsystem is modified. To the first packet 10 a second packet 11 is added to build a composite packet 12. The block size in FIG. 3 is the number of bytes in the data transfer in the CPU 1. This number will be small in comparison to the total number of bytes transferred to or from the disk in the composite packet.

Although the starting sector number of the disk will not change, the length of the data transfer will increase each time by the size of the data block in the new command.

Commands may continue to be sent to the subsystem at the highest data rate possible on the interconnection between the CPU and the memory subsystem. The subsystem continues to cache this data until a command and data packet is received which contains a command code to purge the cache. When this command is received, the new data is appended to the previously cached data, and the SCSI command in the composite packet 12 is updated to reflect the size of the new data block. When this operation is completed, the composite packet is sent to the target disk via the SCSI bus.

FIG. 4 illustrates data allocation and storage of a composite packet on a disk memory.

When the composite packet is received by the target disk, the rotational latency is suffered only during the first rotation of the disk. Once the starting sector 13 is encountered, the data are recorded on the disk continuously, without interruption to decode new commands. After the data of the first block are stored, the data of the following block are stored on the adjacent sector. The data-transfer rate during this operation is the theoretical maximum burst transfer rate of the disk.

It is understood that, although in order to simplify the subsequent recovery of data, each data packet should be of the same size, with only minor modification, blocks with different sizes can be processed. In this case, the composite packet is updated to reflect the length and the number of subpackets cached.

To recover the data, the CPU 1 issues a "read" packet to the subsystem 2, with a data block size equal to that which was previously written. If this is the first read since a write or another read operation was completed, there will be no data in the cache in intermediate memory 2. In this case, the read packet must be a "cache-read", the command containing both the size of each data block and the number of blocks to be read, as well as the starting sector on the disk from which the data are to be read.

The composite block is then read from the disk in one long, continuous stream, without incurring any rotational latency penalties except on the initial sector. Thus the maximum theoretical data transfer rate is achieved during the read operation. The data are transferred from the rotating disk into the intermediate RAM.

The composite data block written to or read from the disk contains a field 7' which identifies the number af data blocks contained in it, and the size of each data block (all blocks within a composite block should be the same size). Therefore, when a composite block is read from the disk, the individual blocks can be separated from each other.

In order to acquire the cached data from the intermediate RAM, the CPU issues a series of "noncache reads", one read for each data block in the composite packet.

While an advantageous embodiment of the invention was shown, it is understood by those skilled in the art that the same is not limited thereto and that various changes and modification can be made without departing from the scope of the invention as defined in the following claims.

What is claimed is:

1. A computer system including at least one central processor unit, a rotating disk memory device in which data is stored on a disk in sectors, and an intermediate memory system for controlling data transfer between said at least one central processor unit and said rotating disk memory device, all connected to a common bus; and wherein said intermediate memory system comprises:
   means, coupled to said bus, for separating data and commands of original data packets received by said intermediate memory system;
   means, coupled to said means for separating, for creating composite data packets, wherein each composite packet consists of a new command and of all data blocks of a number of original data packets received by the intermediate memory system and wherein said new command contains a size indication of each data block; and
   means, coupled to said means for creating for sending the created said composite data packets via said bus to said rotating disk memory device.

2. A computer system according to claim 1, comprising
   means for reading said composite data packets from said rotating disk memory into said intermediate system via said bus;
   means, in said intermediate memory system, for identifying data blocks in the received said composite data packets and for separating individual data blocks in said composite data packets from each other; and
   means, coupled to said means for identifying, for sending said individual data blocks from said intermediate memory system to said at least one CPU via said bus.

3. A computer system according to claim 2, wherein each of a sequence of consecutive original data packets contains data blocks of a same size.

4. A computer system according to claim 1, wherein said intermediate memory system comprises a Random Access Memory.

5. A method of storing data on a peripheral rotating disk memory system, which is connected to one or a plurality of central processor units via a common bus, comprising the steps of:
   temporary storing orginal data packets, which are to be stored in said disk memory system, in an intermediate memory system
   separating data blocks and commands of original data packets, received by intermediate memory system, from each other
   creating composite data packets, wherein a composite packet contains a new command and all data of a number of original data packets received by said intermediate memory system
   writing said composite data packets via said bus on said rotating disk memory device
   purging said intermediate memory system after completing a write operation.

6. A method according to claim 5 and including a method of retrieving data from said disk memory system comprising the steps of reading said composite data packets from said rotational disk memory into said intermediate memory system identifying data blocks in said data packets and separating individual data blocks from each other purging said intermediate memory system after sending said individual data blocks from said intermediate memory system to one of said CPUs.

* * * * *